US012221912B2

(12) United States Patent
Aramaki et al.

(10) Patent No.: US 12,221,912 B2
(45) Date of Patent: Feb. 11, 2025

(54) STRADDLED VEHICLE

(71) Applicant: YAMAHA HATSUDOKI KABUSHIKI KAISHA, Iwata (JP)

(72) Inventors: Yoh Aramaki, Shizuoka (JP); Hisatoshi Kinoshita, Shizuoka (JP); Nobuyuki Kawashima, Shizuoka (JP); Ryota Nakashima, Shizuoka (JP); Satoshi Shiokawa, Shizuoka (JP); Ryo Tomii, Shizuoka (JP); Yuta Shimizu, Shizuoka (JP); Haruhiko Fujita, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/365,587

(22) Filed: Aug. 4, 2023

(65) Prior Publication Data

US 2024/0044276 A1 Feb. 8, 2024

Related U.S. Application Data

(63) Continuation-in-part of application No. PCT/JP2022/003596, filed on Jan. 31, 2022.

(60) Provisional application No. 63/146,163, filed on Feb. 5, 2021.

(51) Int. Cl.

*F01N 11/00* (2006.01)
*F01N 3/10* (2006.01)
*F02D 41/02* (2006.01)
*F02D 41/14* (2006.01)

(52) U.S. Cl.

CPC ............ *F01N 11/007* (2013.01); *F01N 3/101* (2013.01); *F02D 41/0235* (2013.01);

(Continued)

(58) Field of Classification Search

CPC ..... B64C 11/001; B64C 11/008; B64C 27/20; B64C 33/00; B64D 2033/0206;

(Continued)

(56) References Cited

U.S. PATENT DOCUMENTS 5,077,970 A * 1/1992 Hamburg .............. F01N 11/007 60/276
5,545,377 A * 8/1996 Fukaya ................. F01N 11/007 60/299

(Continued)

FOREIGN PATENT DOCUMENTS

FR 2958971 A1 * 10/2011 ............ F01N 11/007
FR 2979949 A1 * 3/2013 ............ F01N 11/007

(Continued)

OTHER PUBLICATIONS

FR2979949 Translation; Cyril; Mar. 15, 2013.*
International Search Report for PCT/JP2022/003596, mailed on Mar. 29, 2022.

*Primary Examiner* — Jesse S Bogue
(74) *Attorney, Agent, or Firm* — Rabin & Berdo, P.C.

(57) ABSTRACT

A straddled vehicle, including: an engine, which includes a combustion chamber; a three-way catalyst, which is configured to purify exhaust gas exhausted from the combustion chamber; an upstream oxygen sensor, which is provided upstream of the three-way catalyst in a flow direction of the exhaust gas, and is configured to detect an oxygen concentration in the exhaust gas; a downstream oxygen sensor, which is provided downstream of the three-way catalyst in the flow direction of the exhaust gas, and is configured to detect the oxygen concentration in the exhaust gas; and a controller, which includes a processor, and a non-transitory storage medium containing program instructions, execution of which by the processor causes the controller to execute a detachment determination process of determining whether the three-way catalyst is detached at least based on a signal input as a signal of the downstream oxygen sensor.

12 Claims, 8 Drawing Sheets

(52) U.S. Cl.
CPC ...... *F02D 41/1454* (2013.01); *F01N 2550/02* (2013.01); *F01N 2550/24* (2013.01); *F01N 2560/025* (2013.01); *F01N 2590/04* (2013.01)

(58) Field of Classification Search
CPC .... F01D 25/04; F01N 11/007; F01N 2550/02; F01N 2550/24; F01N 2560/025; F01N 2590/04; F01N 3/00; F01N 3/101; F02D 41/0235; F02D 41/1454; F02D 45/00
See application file for complete search history.

(56) References Cited

U.S. PATENT DOCUMENTS

| | | | | |
|---|---|---|---|---|
| 6,619,032 | B2 * | 9/2003 | Kakuyama | F01N 11/00 60/285 |
| 8,938,947 | B2 * | 1/2015 | Nakamura | F02D 41/2454 60/276 |
| 9,103,251 | B2 * | 8/2015 | Daiker | F01N 9/00 |
| 9,416,716 | B2 * | 8/2016 | Hayashi | F01N 3/208 |
| 10,982,581 | B2 * | 4/2021 | Santillo | F02D 41/0002 |
| 2012/0324869 | A1 * | 12/2012 | Nakamura | F01N 11/007 60/276 |

FOREIGN PATENT DOCUMENTS

| | | | |
|---|---|---|---|
| JP | H08177469 | A | 7/1996 |
| JP | 2007138837 | A | 6/2007 |
| JP | 2008075458 | A | 4/2008 |
| JP | 2013104405 | A | 5/2013 |
| JP | 2016153608 | A | 8/2016 |
| JP | 2020106002 | A | 7/2020 |
| WO | 2016098896 | A1 | 6/2016 |

* cited by examiner

STRADDLED VEHICLE

CROSS-REFERENCE TO RELATED APPLICATIONS

This application is a continuation-in-part application of International Application No. PCT/JP2022/003596, filed on Jan. 31, 2022, which claims the benefit of the earlier filing date of Provisional Patent Application No. 63/146,163, filed on Feb. 5, 2021. The entire contents of each of the identified applications are incorporated herein by reference.

TECHNICAL FIELD

The present teaching relates to a straddled vehicle including a catalyst configured to purify exhaust gas.

BACKGROUND ART

A straddled vehicle including a three-way catalyst configured to purify exhaust gas has been known (see, e.g., Patent Literature 1). The straddled vehicle refers to all vehicles in which a rider rides in a state of straddling a saddle. The three-way catalyst of the straddled vehicle may be detached by a user. In such a case, the straddled vehicle may run without having the three-way catalyst.

CITATION LIST

Patent Literatures

[Patent Literature 1] International Publication No. 2016/098896

SUMMARY

Technical Problem

It has been demanded to detect that a three-way catalyst has been detached from a straddled vehicle.

An object of the present teaching is to provide a straddled vehicle which is capable of detecting that a three-way catalyst has been detached from the straddled vehicle.

Solution to Problem (1) A straddled vehicle of an embodiment of the present teaching is arranged as described below.

The straddled vehicle comprises: an engine which includes a combustion chamber; a three-way catalyst which is configured to purify exhaust gas exhausted from the combustion chamber; an upstream oxygen sensor which is provided upstream of the three-way catalyst in a flow direction of the exhaust gas and is configured to detect oxygen concentration in the exhaust gas; a downstream oxygen sensor which is provided downstream of the three-way catalyst in the flow direction of the exhaust gas and is configured to detect oxygen concentration in the exhaust gas; and a controller which is configured to execute a detachment determination process of determining whether the three-way catalyst has been detached at least based on a signal input as a signal of the downstream oxygen sensor.

This arrangement makes it possible to detect that the three-way catalyst is detached from the straddled vehicle by using at least the signal input as the signal of the downstream oxygen sensor.

(2) In addition to the arrangement (1) above, the straddled vehicle of the embodiment of the present teaching may be arranged as described below.

In the detachment determination process, the controller is configured to determine whether the three-way catalyst has been detached based on both a signal input as a signal of the upstream oxygen sensor and the signal input as the signal of the downstream oxygen sensor.

According to this arrangement, the precision of determination in the detachment determination process can be improved as compared to a case where only the signal input as the signal of the downstream oxygen sensor is used in the detachment determination process.

(3) In addition to the arrangement (2) above, the straddled vehicle of the embodiment of the present teaching may be arranged as described below.

The controller is configured to perform feedback control of controlling a fuel amount supplied to the combustion chamber based on the signal input as the signal of the upstream oxygen sensor. The feedback control includes first feedback control that is normal feedback control and second feedback control of controlling the fuel amount in such a way that a cycle of increase and decrease of the fuel amount is longer than the cycle in the first feedback control and/or an amplitude of increase and decrease of the fuel amount is larger than the amplitude in the first feedback control. In the detachment determination process, the controller is configured to determine whether the three-way catalyst has been detached based on both the signal input as the signal of the upstream oxygen sensor while the second feedback control is in execution and the signal input as the signal of the downstream oxygen sensor while the second feedback control is in execution.

According to this arrangement, the signal of the downstream oxygen sensor while the second feedback control is in execution is liable to change as compared to the signal of the downstream oxygen sensor while the first feedback control is in execution. On this account, the precision of determination in the detachment determination process can be easily improved as compared to a case where the signal of the upstream oxygen sensor and the signal of the downstream oxygen sensor while the first feedback control is in execution are used for the detachment determination process.

(4) In addition to the arrangement (3) above, the straddled vehicle of the embodiment of the present teaching may be arranged as described below.

In the detachment determination process, the controller is configured to determine whether the three-way catalyst has been detached based on an oxygen sensor delay time that is a delay time of a change of the signal input as the signal of the downstream oxygen sensor from a change of the signal input as the signal of the upstream oxygen sensor while the second feedback control is in execution.

(5) In addition to the arrangement (4) above, the straddled vehicle of the embodiment of the present teaching may be arranged as described below.

In the detachment determination process, the controller is configured to determine whether the three-way catalyst has been detached by comparing the oxygen sensor delay time while the second feedback control is in execution with a threshold.

(6) In addition to the arrangement (4) above, the straddled vehicle of the embodiment of the present teaching may be arranged as described below.

In the detachment determination process, the controller is configured to determine whether the three-way catalyst has been detached by comparing the oxygen sensor delay time while the second feedback control is in execution with the oxygen sensor delay time while the second feedback control prior to the current detachment determination process is in execution.

(7) In addition to at least one of the arrangements (3) to (6) above, the straddled vehicle of the embodiment of the present teaching may be arranged as described below.

The controller is configured to execute a deterioration determination process of determining whether the three-way catalyst has been deteriorated based on both the signal input as the signal of the upstream oxygen sensor while the second feedback control is in execution and the signal input as the signal of the downstream oxygen sensor while the second feedback control is in execution.

(8) In addition to at least one of the arrangements (3) to (6) above, the straddled vehicle of the embodiment of the present teaching may be arranged as described below.

The feedback control includes third feedback control that is different from both the first feedback control and the second feedback control and controls the fuel amount in such a way that a cycle of increase and decrease of the fuel amount is longer than the cycle in the first feedback control and/or an amplitude of increase and decrease of the fuel amount is larger than the amplitude in the first feedback control. The controller is configured to execute a deterioration determination process of determining whether the three-way catalyst has been deteriorated based on both the signal input as the signal of the upstream oxygen sensor while the third feedback control is in execution and the signal input as the signal of the downstream oxygen sensor while the third feedback control is in execution.

(9) In addition to the arrangement (2) above, the straddled vehicle of the embodiment of the present teaching may be arranged as described below.

The controller is configured to perform feedback control of controlling a fuel amount supplied to the combustion chamber based on the signal input as the signal of the upstream oxygen sensor. The feedback control includes first feedback control that is normal feedback control and second feedback control of controlling the fuel amount in such a way that a cycle of increase and decrease of the fuel amount is longer than the cycle in the first feedback control and/or an amplitude of increase and decrease of the fuel amount is larger than the amplitude in the first feedback control. In the detachment determination process, the controller is configured to determine whether the three-way catalyst has been detached based on both the signal input as the signal of the upstream oxygen sensor while the first feedback control is in execution and the signal input as the signal of the downstream oxygen sensor while the first feedback control is in execution.

Because the arrangements described above increase the opportunities to execute the detachment determination process, it is possible to swiftly detect that the three-way catalyst is detached.

(10) In addition to the arrangement (9) above, the straddled vehicle of the embodiment of the present teaching may be arranged as described below.

When the signal input as the signal of the downstream oxygen sensor is changed while the first feedback control is in execution, the controller is configured to execute the detachment determination process of determining whether the three-way catalyst has been detached based on an oxygen sensor delay time that is a delay time of a change of the signal input as the signal of the downstream oxygen sensor from a change of the signal input as the signal of the upstream oxygen sensor while the first feedback control is in execution.

(11) In addition to the arrangement (10) above, the straddled vehicle of the embodiment of the present teaching may be arranged as described below.

In the detachment determination process, the controller is configured to determine whether the three-way catalyst has been detached by comparing the oxygen sensor delay time while the first feedback control is in execution with a threshold.

(12) In addition to the arrangement (10) above, the straddled vehicle of the embodiment of the present teaching may be arranged as described below.

In the detachment determination process, the controller is configured to determine whether the three-way catalyst has been detached by comparing the oxygen sensor delay time while the first feedback control is in execution with the oxygen sensor delay time while the first feedback control prior to the current detachment determination process is in execution.

(13) In addition to the arrangement (9) above, the straddled vehicle of the embodiment of the present teaching may be arranged as described below.

In the detachment determination process, the controller is configured to determine whether the three-way catalyst has been detached based on the number of changes of the signal input as the signal of the upstream oxygen sensor during a first time period in which the first feedback control is in execution and the number of changes of the signal input as the signal of the downstream oxygen sensor during the first time period in which the first feedback control is in execution.

(14) In addition to the arrangement (2) above, the straddled vehicle of the embodiment of the present teaching may be arranged as described below.

The controller is configured to perform feedback control of controlling a fuel amount supplied to the combustion chamber based on the signal input as the signal of the upstream oxygen sensor. when the feedback control shifts to fuel cut control in which supply of fuel to the combustion chamber is temporarily stopped, the controller is configured to execute the detachment determination process of determining whether the three-way catalyst has been detached based on a delay time of a change of the signal input as the signal of the downstream oxygen sensor while the fuel cut control is in execution from a change of the signal input as the signal of the upstream oxygen sensor while the feedback control or the fuel cut control is in execution.

(15) In addition to the arrangement (1) above, the straddled vehicle of the embodiment of the present teaching may be arranged as described below.

The controller is configured to perform feedback control of controlling a fuel amount supplied to the combustion chamber based on the signal input as the signal of the upstream oxygen sensor. When the feedback control shifts to fuel cut control in which supply of fuel to the combustion chamber is temporarily stopped, the controller is configured to execute the detachment determination process of determining whether the three-way catalyst has been detached based on a delay time of a change of the signal input as the signal of the downstream oxygen sensor while the fuel cut control is in execution from start of the fuel cut control.

(16) In addition to the arrangement (2) above, the straddled vehicle of the embodiment of the present teaching may be arranged as described below.

The controller is configured to determine in the detachment determination process that the three-way catalyst has been detached, when the signal that is input as the signal of the upstream oxygen sensor is a signal that is input when the upstream oxygen sensor is detached from the straddled vehicle and the signal that is input as the signal of the downstream oxygen sensor is a signal that is input when the downstream oxygen sensor is detached from the straddled vehicle.

(17) In addition to the arrangement (1) above, the straddled vehicle of the embodiment of the present teaching may be arranged as described below.

The controller is configured to determine that the three-way catalyst has been detached when the signal input as the signal of the downstream oxygen sensor is a signal that is input when the downstream oxygen sensor is detached from the straddled vehicle.

In the detachment determination process of the embodiment of the present teaching, at least two of the above-described determination conditions may be combined. For example, the controller does not determine that the three-way catalyst has been detached when only one determination condition is satisfied, and determines that the three-way catalyst has been detached when two or more determination conditions are satisfied. For example, the above-described arrangement (12) may be combined with the above-described arrangement (13).

In the present teaching, the downstream oxygen detector may be an O2 sensor configured to detect whether the oxygen concentration is higher than a predetermined value or not. The downstream oxygen sensor may be an A/F sensor which is configured to output a linear detection signal corresponding to the oxygen concentration. In the present teaching, the upstream oxygen sensor may be an O2 sensor or an A/F sensor. The A/F sensor is configured to continuously detect changes of the oxygen concentration. The O2 sensor is configured to output a signal at a first voltage when the oxygen concentration is lower than a predetermined value, and to output a signal at a second voltage when the oxygen concentration is higher than the predetermined value. When both of the upstream oxygen sensor and the downstream oxygen sensor are O2 sensors, the predetermined value of the upstream oxygen sensor and the predetermined value of the downstream oxygen sensor may be identical with each other or different from each other. When the upstream oxygen sensor is an O2 sensor, the upstream oxygen sensor detects whether the air-fuel ratio of air-fuel mixture of air and fuel is higher than a predetermined air-fuel ratio, in terms of the rate of fuel. In this description, when the air-fuel ratio of air-fuel mixture is higher than a predetermined air-fuel ratio in terms of the rate of fuel, the air-fuel ratio is rich. When the air-fuel ratio of air-fuel mixture is lower than the predetermined air-fuel ratio in terms of the rate of fuel, the air-fuel ratio is lean. The predetermined air-fuel ratio is basically a window of air-fuel ratios encompassing the stoichiometric air-fuel ratio, but may be a window of air-fuel ratios which encompasses an air-fuel ratio close to the stoichiometric air-fuel ratio but does not encompass the stoichiometric air-fuel ratio.

In the present teaching, a signal input as a signal of a downstream oxygen sensor is a signal input to a controller as a signal of a downstream oxygen sensor. The controller includes a downstream oxygen sensor interface which is connectable to the downstream oxygen sensor. The signal input as a signal of the downstream oxygen sensor is a signal input to the downstream oxygen sensor interface included in the controller. The downstream oxygen sensor interface may be electrically connected to the downstream oxygen sensor by wire, The downstream oxygen sensor interface may be connected to the downstream oxygen sensor by wireless communication. The signal input as the signal of the downstream oxygen sensor may be an actual signal of the downstream oxygen sensor input to the controller when the downstream oxygen sensor is electrically connected to the controller. Alternatively, the signal may be a signal input to the controller as a signal of the downstream oxygen sensor when the downstream oxygen sensor is not electrically connected to the controller because, for example, the downstream oxygen sensor is detached or disconnection has occurred between the downstream oxygen sensor and the controller. In other words, the signal input as a signal of the downstream oxygen sensor is either a signal input to the downstream oxygen sensor interface electrically connected to the downstream oxygen sensor or a signal input to the downstream oxygen sensor interface not electrically connected to the downstream oxygen sensor. A value of the signal input to the downstream oxygen sensor interface electrically connected to the downstream oxygen sensor varies. On the other hand, a value of the signal input to the downstream oxygen sensor interface not electrically connected to the downstream oxygen sensor is maintained to be constant. For example, the signal input to the downstream oxygen sensor interface electrically connected to the downstream oxygen sensor by wire is a signal in which at least one of the voltage or the current varies. The signal input to the downstream oxygen sensor interface electrically not connected to the downstream oxygen sensor may be a signal in which the voltage and the current are maintained at predetermined values. When the downstream oxygen sensor is the O2 sensor, the voltage value of the signal input to the downstream oxygen sensor interface electrically connected to the downstream oxygen sensor may be maintained at the first voltage or the second voltage for a fairly long time. When the downstream oxygen sensor is the O2 sensor, the voltage value of the signal input to the downstream oxygen sensor interface not electrically connected to the downstream oxygen sensor is equal to neither the first voltage nor the second voltage described above. When the downstream oxygen sensor is the O2 sensor, the voltage value of the signal input to the downstream oxygen sensor interface not electrically connected to the downstream oxygen sensor may fall within a range between the first voltage and the second voltage, or may be out of the range between the first voltage and the second voltage. The definition of a signal input as a signal of an upstream oxygen sensor is identical with the definition of the signal input as the signal of the downstream oxygen sensor. The controller includes an upstream oxygen sensor interface which is connectable to the upstream oxygen sensor. When the downstream oxygen sensor interface receives a signal from the downstream oxygen sensor by wireless and the upstream oxygen sensor interface receives a signal from the upstream oxygen sensor by wireless, the downstream oxygen sensor interface may function as both the downstream oxygen sensor interface and the upstream oxygen sensor interface.

In the present teaching, feedback control indicates that a fuel amount is controlled so that the air-fuel ratio of air-fuel mixture in a combustion chamber alternately switches between rich and lean. While the feedback control is being performed, the fuel amount periodically increases and decreases. In the present teaching, the controller may perform the feedback control in such a way that the fuel amount is decreased when the first voltage (signal indicating the rich) is input to the controller as a signal of the upstream oxygen sensor and the fuel amount is increased when the second voltage (signal indicating the lean) is input to the controller as a signal of the upstream oxygen sensor. While the feedback control is in execution, the controller may set the fuel amount based on a basic fuel amount and a feedback correction coefficient. The feedback correction coefficient is a correction value used for increasing and decreasing the fuel amount. By the feedback correction coefficient, the basic fuel amount is multiplied. The basic fuel amount is set based on, for example, an engine rotation speed. As the feedback correction coefficient is increased and decreased, the fuel amount is increased and decreased. The cycle of the feedback correction coefficient coincides with the cycle of increase and decrease of the fuel amount. As the amplitude of the feedback correction coefficient is increased, the amplitude of increase and decrease of the fuel amount is increased. When the cycle and/or amplitude of increase and decrease of the fuel amount is increased, for example, the controller may increase a time until the fuel amount starts to decrease after the first voltage is input to the controller and a time until the fuel amount starts to increase after the second voltage is input to the controller.

In the present teaching, to control the fuel amount in such a way that the cycle of increase and decrease of the fuel amount is longer than the cycle in first feedback control and/or the amplitude of increase and decrease of the fuel amount is larger than the amplitude in the first feedback control may be to control the fuel amount in such a way that the cycle of increase and decrease of the fuel amount is longer than the cycle in the first feedback control. Alternatively, to control the fuel amount as above may be to control the fuel amount in such a way that the amplitude of increase and decrease of the fuel amount is larger than the amplitude in the first feedback control. Alternatively, to control the fuel amount as above may be to control the fuel amount in such a way that the cycle of increase and decrease of the fuel amount is longer than the cycle in first feedback control and the amplitude of increase and decrease of the fuel amount is larger than the amplitude in the first feedback control.

In the present teaching, second feedback control is control of the fuel amount by which a signal of the downstream oxygen sensor is varied. The second feedback control is different from the first feedback control in terms of the cycle and/or amplitude of increase and decrease of the fuel amount. The first and second feedback controls may be different from each other in terms of both the cycle and amplitude, only in terms of the cycle, or only in terms of the amplitude. When the first and second feedback controls are different in terms of the cycle of increase and decrease of the fuel amount, the cycle of increase and decrease of the fuel amount in the second feedback control is longer than the cycle of increase and decrease of the fuel amount in the first feedback control. When the first and second feedback controls are different in terms of the amplitude of increase and decrease of the fuel amount, the amplitude of increase and decrease of the fuel amount in the second feedback control is larger than the amplitude of increase and decrease of the fuel amount in the first feedback control.

In the present teaching, third feedback control is control of the fuel amount by which a signal of the downstream oxygen sensor is varied. The third feedback control is different from the second feedback control in terms of the cycle and/or amplitude of increase and decrease of the fuel amount. The second and third feedback controls may be different from each other in terms of both the cycle and amplitude, only in terms of the cycle, or only in terms of the amplitude. When the second and third feedback controls are different in terms of the cycle of increase and decrease of the fuel amount, the cycle of increase and decrease of the fuel amount in the third feedback control may be shorter than or longer than the cycle of increase and decrease of the fuel amount in the second feedback control. When the second and third feedback controls are different in terms of the amplitude of increase and decrease of the fuel amount, the amplitude of increase and decrease of the fuel amount in the third feedback control may be smaller than or larger than the amplitude of increase and decrease of the fuel amount in the second feedback control. In the third feedback control, the controller may control the fuel amount in such a way that the cycle of increase and decrease of the fuel amount is shorter than the cycle in the second feedback control and/or the amplitude of increase and decrease of the fuel amount is smaller than the amplitude in the second feedback control. In the third feedback control, the controller may control the fuel amount in such a way that the cycle of increase and decrease of the fuel amount is longer than the cycle in the second feedback control and/or the amplitude of increase and decrease of the fuel amount is larger than the amplitude in the second feedback control.

In the present teaching, a delay time from a change of a signal input as a signal of the downstream oxygen sensor from a change of a signal input as a signal of the upstream oxygen sensor may be, for example, a time from a time point at which the signal input as the signal of the upstream oxygen sensor becomes at a reference value to a time point at which the signal input as the signal of the downstream oxygen sensor becomes at the reference value. When the upstream oxygen sensor and the downstream oxygen sensor are 02 sensors, the reference value may be, for example, a value equidistant from the first voltage and the second voltage or may be the second voltage. This definition is applicable to both an oxygen sensor delay time while the first feedback control is in execution and an oxygen sensor delay time while the second feedback control is in execution. This definition is also applicable to a delay time of a change of a signal input as a signal of the downstream oxygen sensor while the fuel cut control is in execution from a change of a signal input as a signal of the upstream oxygen sensor while the feedback control or the fuel cut control is in execution. In the present teaching, the oxygen sensor delay time while the second feedback control is in execution indicates a delay time of a change of a signal input as a signal of the downstream oxygen sensor while the second feedback control is in execution from a change of a signal input as a signal of the upstream oxygen sensor while the second feedback control is in execution. In the present teaching, the oxygen sensor delay time while the first feedback control is in execution indicates a delay time of a change of a signal input as a signal of the downstream oxygen sensor while the first feedback control is in execution from a change of a signal input as a signal of the upstream oxygen sensor while the first feedback control is in execution.

In the present teaching, to determine whether a three-way catalyst has been detached by comparing an oxygen sensor delay time with a threshold may be, for example, to determine that the three-way catalyst has been detached when the oxygen sensor delay time is shorter than the threshold. The threshold may be constant or may be changed in accordance with the driving condition of the engine. This definition is applicable to both an oxygen sensor delay time while the first feedback control is in execution and an oxygen sensor delay time while the second feedback control is in execution. When the oxygen sensor delay time while the second feedback control is in execution is used for both a detachment determination process and a deterioration determination process and the oxygen sensor delay time is compared with a threshold in each of these determination processes, the threshold used in the detachment determination process is different from the threshold used in the deterioration determination process.

In the present teaching, in the detachment determination process, the controller may compare an oxygen sensor delay time while the first or second feedback control is in execution with an oxygen sensor delay time while the first or second feedback control prior to the current detachment determination process is in execution. In other words, the controller may determine whether the three-way catalyst has been detached by comparing the oxygen sensor delay time with the past oxygen sensor delay time. In such a case, for example, the controller may determine that the three-way catalyst has been detached when the oxygen sensor delay time is shorter than the past oxygen sensor delay time and the difference between these times is larger than a reference value. The past oxygen sensor delay time that is the target of comparison may be calculated from plural oxygen sensor delay times. For example, the past oxygen sensor delay time may be an average of plural oxygen sensor delay times. To be more specific, for example, an average of oxygen sensor delay times detected during plural driving cycles may be used. Each driving cycle is a period from the start to stop of the engine. The reference value may be constant or may be changed in accordance with the driving condition of the engine.

In the present teaching, the number of changes of a signal input as a signal of the upstream oxygen sensor during a first time period in which the first feedback control is in execution may be, for example, the number of times when the signal input as the signal of the upstream oxygen sensor becomes at the second voltage during the first time period or the number of times when the signal input as the signal of the upstream oxygen sensor becomes at a value equidistant from the first voltage and the second voltage during the first time period. In the present teaching, the number of changes of a signal input as a signal of the downstream oxygen sensor during a first time period in which the first feedback control is in execution may be, for example, the number of times when the signal input as the signal of the downstream oxygen sensor becomes at the second voltage during the first time period or the number of times when the signal input as the signal of the downstream oxygen sensor becomes at a value equidistant from the first voltage and the second voltage during the first time period. The first time period may be, for example, a period of several seconds or a period from the start of the engine to the current time.

In the present teaching, to determine whether the three-way catalyst has been detached based on the number of changes of a signal input as a signal of the upstream oxygen sensor during the first time period and the number of changes of a signal input as a signal of the downstream oxygen sensor during the first time period may be, for example, to determine that the three-way catalyst has been detached when the number of changes of the signal input as the signal of the upstream oxygen sensor during the first time period is larger than a first threshold and the number of changes of the signal input as the signal of the downstream oxygen sensor during the first time period is larger than a second threshold. The first threshold is larger than the second threshold. The first threshold may be constant or may be changed in accordance with the driving condition of the engine. The second threshold may be constant or may be changed in accordance with the driving condition of the engine. Instead of comparing the number of changes of the signal input as the signal of the oxygen sensor during the first time period with the threshold, the number of changes per unit time of the signal input as the signal of the oxygen sensor during the first time period may be compared with the threshold.

In the present teaching, a delay time of a change of a signal input as a signal of the downstream oxygen sensor from start of the fuel cut control may be, for example, a time from the start of the fuel cut control to a moment when the signal input as the signal of the downstream oxygen sensor becomes at a reference value. When the downstream oxygen sensor is an O2 sensor, the reference value may be, for example, a value equidistant from the first voltage and the second voltage or may be the second voltage.

In the present teaching, in the detachment determination process, the controller may determine whether the three-way catalyst has been detached based on a delay time of a change of a signal input as a signal of the downstream oxygen sensor while the fuel cut control is in execution and a change of a signal input as a signal of the upstream oxygen sensor while the feedback control or the fuel cut control is in execution. Furthermore, in the present teaching, in the detachment determination process, the controller may determine whether the three-way catalyst has been detached based on a delay time of a change of a signal input as a signal of the downstream oxygen sensor from start of the fuel cut control. In these cases, the feedback control immediately before the fuel cut control may be normal feedback control or feedback control of controlling the fuel amount so that the cycle of increase and decrease of the fuel amount is longer than that of the normal feedback control and/or the amplitude of increase and decrease of the fuel amount is larger than that of the normal feedback control. Furthermore, in these cases, the controller may determine whether the three-way catalyst has been detached by comparing a delay time with a threshold. Alternatively, the controller may determine whether the three-way catalyst has been detached by comparing a delay time with a past delay time. A specific example of determining whether the three-way catalyst has been detached by comparing a delay time with a threshold is identical with the above-described specific example of determining whether the three-way catalyst has been detached by comparing the oxygen sensor delay time with the threshold. A specific example of determining whether the three-way catalyst has been detached by comparing a delay time with a past delay time is identical with the above-described specific example of determining whether the three-way catalyst has been detached by comparing the oxygen sensor delay time with the past oxygen sensor delay time.

In the present teaching, when the controller determines whether the three-way catalyst is deteriorated based on both a signal input as a signal of the upstream oxygen sensor and a signal input as a signal of the downstream oxygen sensor while the third feedback control is in execution, the controller may not perform at least one of determination as to whether the three-way catalyst is deteriorated based on both a signal input as a signal of the upstream oxygen sensor and a signal input as a signal of the downstream oxygen sensor while the second feedback control is in execution or determination as to whether the three-way catalyst is detached based on both a signal input as a signal of the upstream oxygen sensor and a signal input as a signal of the downstream oxygen sensor while the third feedback control is in execution.

In the present teaching, the controller includes a processor configured to execute at least the detachment determination process. In the present teaching, "processor" encompasses a CPU (Central Processing Unit), a GPU (Graphics Processing Unit), a micro-processor, a multi processor, an application specific integrated circuit (ASIC), a programmable logic circuit (PLC), a field programmable gate array (FPGA), and other types of circuits capable of executing processes described in this description. In the present teaching, the controller includes a non-transitory storage medium. The non-transitory storage medium includes program instructions, execution of which by the processor causes the controller to execute a detachment determination process of determining whether the three-way catalyst has been detached at least based on a signal input as a signal of the downstream oxygen sensor. The non-transitory storage medium includes program instructions, execution of which by the processor causes the controller to execute a deterioration determination process of determining whether the three-way catalyst has been deteriorated at least based on a signal input as a signal of the downstream oxygen sensor.

In the present teaching, the straddled vehicle includes a motorcycle, a motor tricycle, a four-wheeled buggy (ATV: All Terrain Vehicle), a snowmobile, a personal watercraft, and the like. The motorcycle includes a scooter, an engine-equipped bicycle, a moped, etc. In the present teaching, the straddled vehicle may include at least one front wheel and at least one rear wheel. The driving wheel driven by a power source may be the front wheel, the rear wheel or both the front wheel and the rear wheel. In the present teaching, as a power source (driving source) for generating power for running, the straddled vehicle may include an electric motor in addition to the engine.

In the present teaching, the straddled vehicle may include a muffler (silencer). In this case, the three-way catalyst that is a target of the detachment determination process may be provided upstream of the muffler in the flow direction of exhaust gas, or may be provided inside the muffler. In the present teaching, the three-way catalyst that is a target of the detachment determination process may be formed of plural catalysts that are spaced apart from one another in the flow direction of exhaust gas. In the present teaching, the straddled vehicle may include a catalyst different from the three-way catalyst that is a target of the detachment determination process. Another catalyst, however, is not provided between the upstream oxygen sensor and the three-way catalyst that is a target of the detachment determination process. Another catalyst is not provided between the downstream oxygen sensor and the three-way catalyst that is a target of the detachment determination process. The catalyst different from the three-way catalyst that is a target of the detachment determination process may be provided upstream of the upstream oxygen sensor or downstream of the downstream oxygen sensor.

In the present teaching, the engine may be a single-cylinder engine having one combustion chamber or a multi-cylinder engine having plural combustion chambers. The fuel may be gasoline or a mixture of gasoline and alcohol. In the present teaching, the engine may be a four-stroke engine or a two-stroke engine. The four-stroke engine is suitable for the present teaching as compared to the two-stroke engine. In the present teaching, the engine may include a spark plug which is configured to ignite air-fuel mixture in a combustion chamber. In the present teaching, the engine may include a throttle valve which is configured to adjust an amount of air supplied to a combustion chamber. The throttle valve may be an electronic-controlled throttle valve controlled by the controller or a mechanical-controlled throttle valve. The opening degree of the electronic-controlled throttle valve is basically controlled by the controller in accordance with an operation by the rider. The opening degree of the electronic-controlled throttle valve may be controlled by the controller without an operation by the rider. The opening degree of the mechanical-controlled throttle valve is controlled by an operation by the rider. In the present teaching, when the engine is a multi-cylinder engine, a throttle valve may be provided for each combustion chamber. This arrangement is suitable for the present teaching as compared to an arrangement in which one throttle valve is provided for plural combustion chambers. In the present teaching, the engine may include a fuel injector which is configured to inject fuel into an intake passage member connected to a combustion chamber. This arrangement is suitable for the present teaching as compared to an arrangement in which a fuel injector configured to inject fuel is provided in a combustion chamber.

When the engine of the present teaching is a four-stroke engine, the engine includes an intake valve configured to open and close an intake port formed in a combustion chamber and an exhaust valve configured to open and close an exhaust port formed in a combustion chamber. In the present teaching, the engine may include a variable valve timing mechanism which is configured to change timings to open and close an intake valve and/or an exhaust valve. The variable valve timing mechanism may be arranged so that, in at least part of a driving range, part of an open valve period of the intake valve may overlap part of an open valve period of the exhaust valve. The engine of the present teaching may not include the variable valve timing mechanism, and timings to open and close the intake valve and the exhaust valve may be constant. When the variable valve timing mechanism cannot be provided, the engine of the present teaching may be arranged so that part of an open valve period of the intake valve overlaps part of an open valve period of the exhaust valve. The period in which the valve open periods overlap each other is termed a valve overlap period. With the valve overlap period, it is possible to increase the output of the engine. The valve overlap period of the straddled vehicle tends to be typically longer than that of an automobile. Furthermore, the engine rotation speed range of the straddled vehicle tends to be typically wider than the engine rotation speed range of an automobile. Furthermore, the load range of the straddled vehicle tends to be typically wider than the load range of an automobile. As such, the driving range of the straddled vehicle tends to be typically wider than the driving range of an automobile. On this account, when the straddled vehicle has the variable valve timing mechanism, the driving range in which the valve opening periods overlap each other tends to be wide as compared to an automobile.

In the present teaching, the engine may be an auxiliary chamber engine having a combustion chamber including a main chamber and an auxiliary chamber. In the present teaching, the engine may not be an auxiliary chamber engine. The straddled vehicle of the present teaching may or may not include a forced induction device which is configured to pressurize air in order to supply the pressurized air to a combustion chamber. The forced induction device may be a mechanical supercharger, a motor-driven supercharger, or a turbocharger.

In the description, at least one of plural options encompasses all conceivable combinations of the options. At least one of plural options may be one of the options, some of the options, or all of the options. For example, at least one of A, B, or C indicates only A, only B, only C, A and B, A and C, B and C, or A, B, and C. A and/or B means both A and B, only A, or only B. In this definition, A and B are not limited to noun, and may be verb.

In the claims, when the number of constituent features is not clearly specified and the constituent feature is expressed in a singular form in English, the number of the constituent feature may be more than one in the present teaching. In the present teaching, the number of the constituent features may be only one.

In the present teaching, the terms "including", "having", and "comprising" and derivatives thereof are used with intention of including additional items in addition to the listed items and equivalents thereof.

Unless otherwise defined, all terms (technical and scientific terms) used in this description and claims indicate meanings typically understood by a person with ordinary skill in the art in the technical field to which the present teaching belongs. Terms such as those defined in commonly used dictionaries are to be interpreted as having meaning that is consistent with their meaning in the context of the relevant art and the present disclosure, and are not to be interpreted in an idealized or excessively formal sense.

In this description, the term "may" is non-exclusive. The term "may" indicate "may but not must". In this description, "may" implicitly encompasses "do not".

Before describing embodiments of the present teaching in detail, it is to be understood that the present teaching is not limited to the details of construction and arrangement of the components set forth in the following description or illustrated in the drawings. The present teaching is also applicable to embodiments other than the embodiments described later. The present teaching may be implemented as an embodiment other than the below-described embodiment.

DESCRIPTION OF EMBODIMENTS

Figure 1:
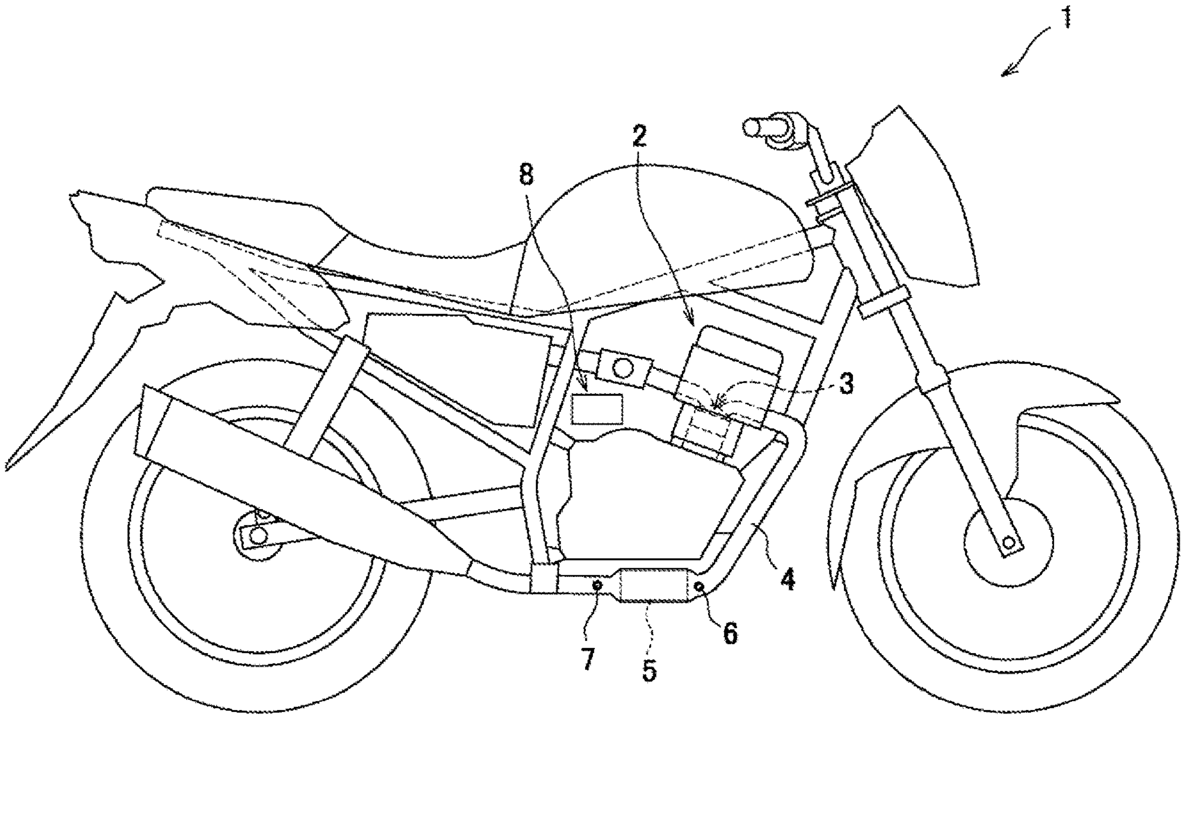
FIG. 1 is a side view of a straddled vehicle of First Embodiment of the present teaching.
Figure 8:
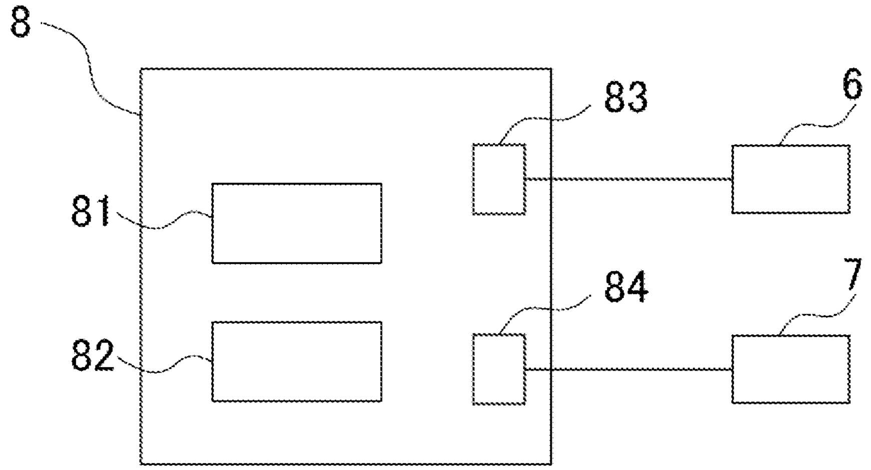
FIG. 8 is a control block diagram of the straddled vehicle of First Embodiment of the present teaching.

The following will describe a straddled vehicle 1 of First Embodiment of the present teaching with reference to FIG. 1 and FIG. 8. In FIG. 1, the straddled vehicle 1 is a motorcycle. It is noted that the straddled vehicle of the present teaching is not limited to the motorcycle. The straddled vehicle 1 includes an engine 2 including a combustion chamber 3, an exhaust unit 4 connected to the engine 2, and a controller 8. The exhaust unit 4 includes a three-way catalyst 5 configured to purify exhaust gas exhausted from the combustion chamber 3, an upstream oxygen sensor 6 provided upstream of the three-way catalyst 5 in a flow direction of the exhaust gas, and a downstream oxygen sensor 7 provided downstream of the three-way catalyst 5 in the flow direction of the exhaust gas. The upstream oxygen sensor 6 and the downstream oxygen sensor 7 are configured to detect the oxygen concentration in the exhaust gas. The controller 8 is configured to execute a detachment determination process of determining whether the three-way catalyst 5 has been detached from the straddled vehicle 1 at least based on a signal input as a signal of the downstream oxygen sensor 7. The positions of the three-way catalyst 5, the upstream oxygen sensor 6, and the downstream oxygen sensor 7 are not limited to those shown in FIG. 1. As shown in FIG. 8, the controller 8 includes a processor 81, a non-transitory recording medium 82, an upstream oxygen sensor interface 83, and a downstream oxygen sensor interface 84. The upstream oxygen sensor interface 83 is electrically connected to the upstream oxygen sensor 6. The downstream oxygen sensor interface 84 is electrically connected to the downstream oxygen sensor 7.

Figure 2:
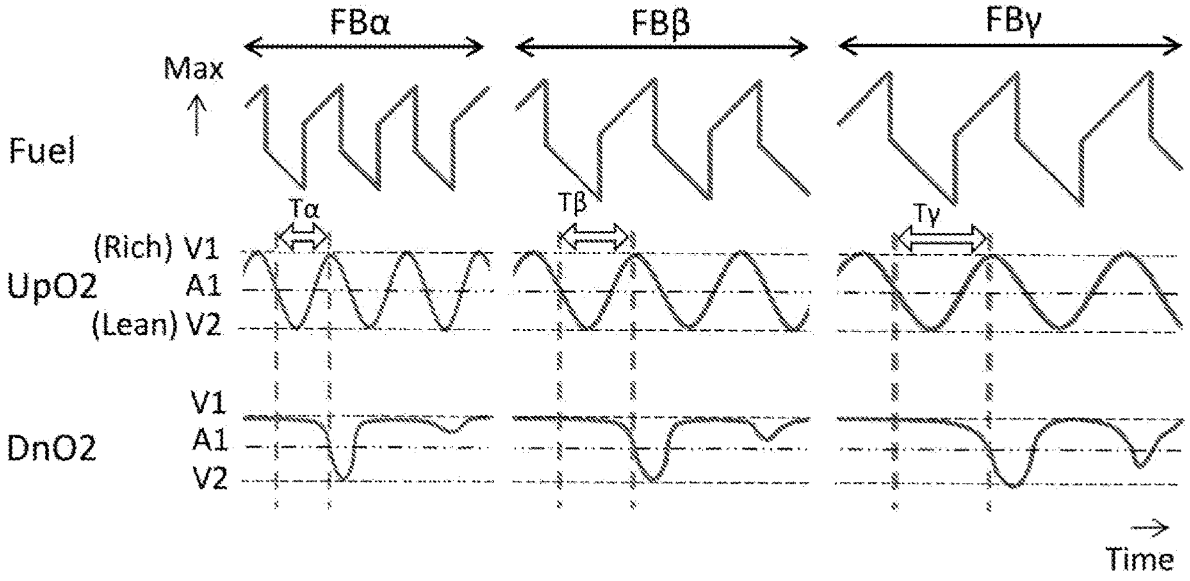
FIG. 2 shows graphs for explaining Second to Eighth Embodiments of the present teaching.
Figure 3:
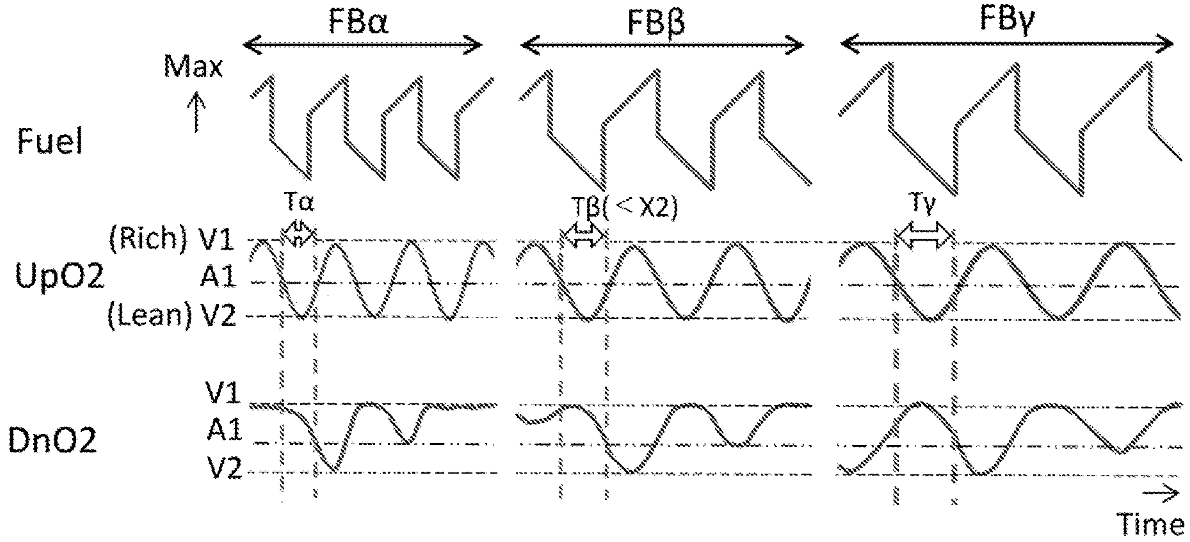
FIG. 3 shows graphs for explaining Second to Eighth Embodiments of the present teaching.
Figure 4:
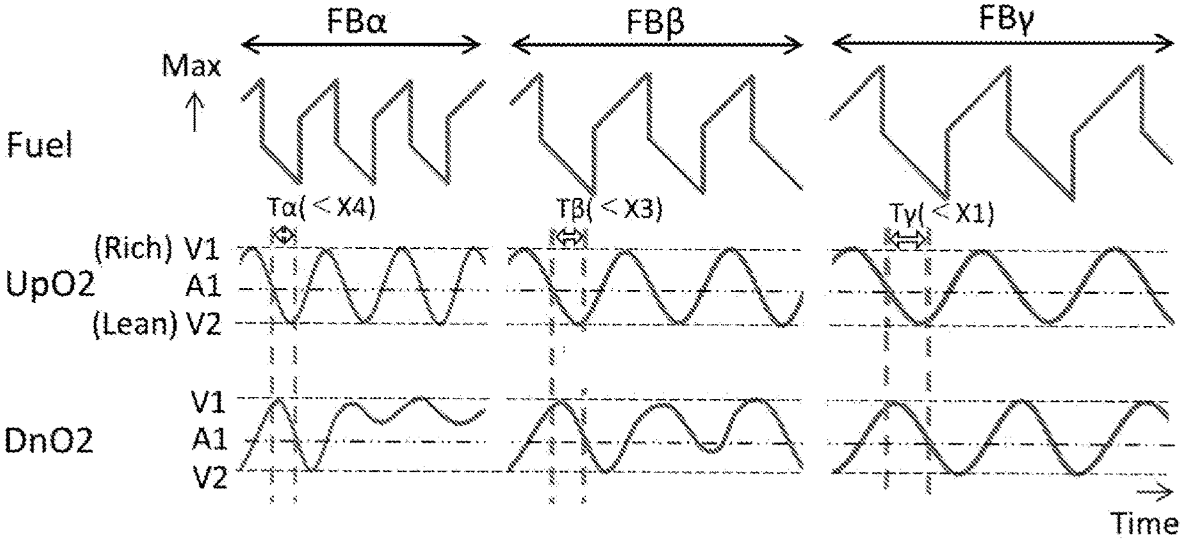
FIG. 4 shows graphs for explaining Second to Eighth Embodiments of the present teaching.
Figure 5:
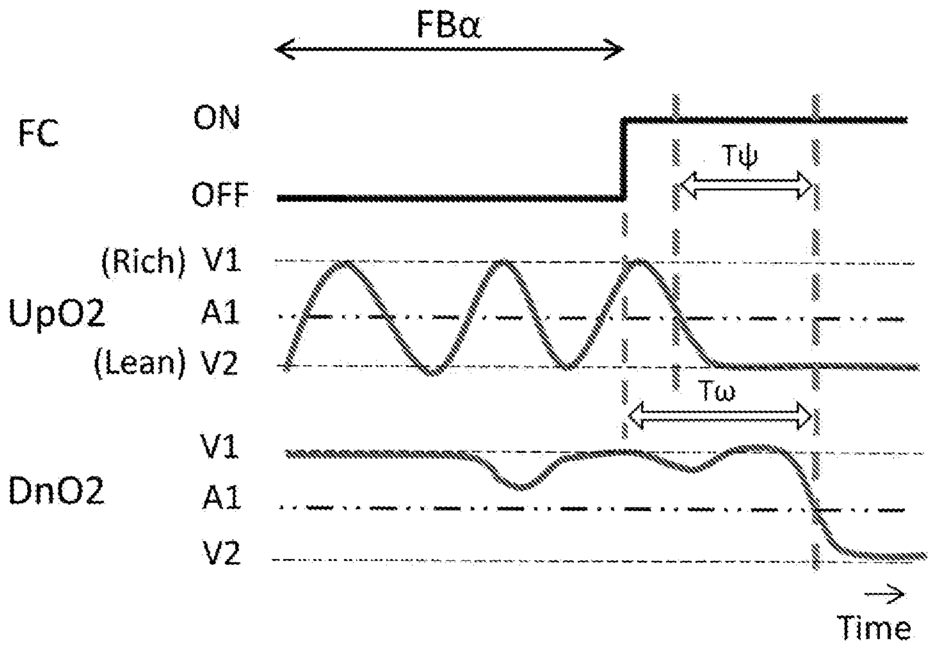
FIG. 5 shows graphs for explaining Ninth and Tenth Embodiments of the present teaching.
Figure 6:
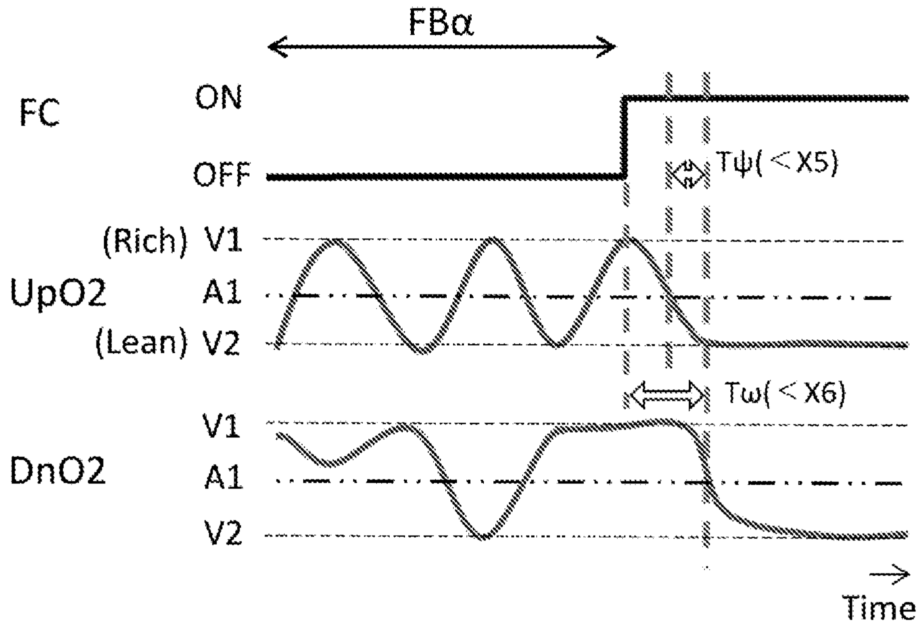
FIG. 6 shows graphs for explaining Ninth and Tenth Embodiments of the present teaching.

The following will describe Second to Ninth Embodiments of the present teaching with reference to graphs shown in FIG. 2 to FIG. 6. Straddled vehicles 1 of Second to Ninth Embodiments encompass all features of First Embodiment. FIG. 2 to FIG. 4 show graphs for describing Second to Seventh Embodiments, whereas FIG. 5 and FIG. 6 show graphs for describing Eighth and Ninth Embodiments. In the graphs shown in FIG. 2 to FIG. 6, UpO2 indicates the upstream oxygen sensor 6 and DnO2 indicates the downstream oxygen sensor 7. FIG. 2 to FIG. 6 include a graph showing changes over time of a signal of the upstream oxygen sensor 6 and a signal of the downstream oxygen sensor 7 when the upstream oxygen sensor 6 and the downstream oxygen sensor 7 are not detached. The detachment determination processes described in Second to Ninth Embodiments are all detachment determination processes that are effective when the three-way catalyst 5 is detached but the upstream oxygen sensor 6 and the downstream oxygen sensor 7 are not detached. In Second to Ninth Embodiments, a signal input to the controller 8 as a signal of the downstream oxygen sensor 7 is simply termed a signal of the downstream oxygen sensor 7, and a signal input to the controller 8 as a signal of the upstream oxygen sensor 6 is simply termed a signal of the upstream oxygen sensor 6. In Second to Ninth Embodiments, the upstream oxygen sensor 6 and the downstream oxygen sensor 7 are O2 sensors. The controller 8 of each of Second to Eighth Embodiments determines, in the detachment determination process, whether the three-way catalyst 5 has been detached based on both a signal of the upstream oxygen sensor 6 and a signal of the downstream oxygen sensor 7. The controller 8 of Ninth Embodiment determines, in the detachment determination process, whether the three-way catalyst 5 has been detached not based on a signal of the upstream oxygen sensor 6 but based on a signal of the downstream oxygen sensor 7. In each of Second to Ninth Embodiments, the controller 8 is configured to perform feedback control of controlling a fuel amount supplied to the combustion chamber 3 based on a signal of the upstream oxygen sensor 6. The feedback control includes at least feedback control FB$\alpha$ which is normal feedback control. The feedback control FB$\alpha$ is equivalent to first feedback control of the present teaching.

To begin with, Second and Third Embodiments will be described with reference to the graphs shown in FIG. 2 to FIG. 4. In Second and Third Embodiments, the feedback control includes feedback control FB$\beta$ of controlling the fuel amount in such a way that the cycle of increase and decrease of the fuel amount is longer than the cycle in the feedback control FBα and/or the amplitude of increase and decrease of the fuel amount is larger than the amplitude in the feedback control FBα. Furthermore, in Second and Third Embodiments, the feedback control includes feedback control FBγ of controlling the fuel amount in such a way that the cycle of increase and decrease of the fuel amount is longer than the cycle in the feedback control FBβ and/or the amplitude of increase and decrease of the fuel amount is larger than the amplitude in the feedback control FBβ. The controller 8 of Second Embodiment determines, in the detachment determination process, whether the three-way catalyst 5 has been detached based on both a signal of the upstream oxygen sensor 6 and a signal of the downstream oxygen sensor 7 while the feedback control FBγ is in execution. The controller 8 of Second Embodiment is configured to execute a deterioration determination process of determining whether the three-way catalyst 5 has been deteriorated, based on both a signal of the upstream oxygen sensor 6 and a signal of the downstream oxygen sensor 7 while the feedback control FBβ is in execution. On the other hand, the controller 8 of Third Embodiment determines, in the detachment determination process, whether the three-way catalyst 5 has been detached based on both a signal of the upstream oxygen sensor 6 and a signal of the downstream oxygen sensor 7 while the feedback control FBβ is in execution. The controller 8 of Third Embodiment is configured to execute a deterioration determination process of determining whether the three-way catalyst 5 has been deteriorated, based on both a signal of the upstream oxygen sensor 6 and a signal of the downstream oxygen sensor 7 while the feedback control FBγ is in execution. In other words, in Second and Third Embodiments, the feedback control for executing the detachment determination process is different from the feedback control for executing the deterioration determination process and the normal feedback control. In Second Embodiment, the feedback control FBβ is equivalent to third feedback control of the present teaching, and the feedback control FBγ is equivalent to second feedback control of the present teaching. In Third Embodiment, the feedback control FBβ is equivalent to the second feedback control of the present teaching, and the feedback control FBγ is equivalent to the third feedback control of the present teaching. The cycle and amplitude of increase and decrease of the fuel amount in the feedback control FBβ in Second Embodiment may be identical with the cycle and amplitude of increase and decrease of the fuel amount in the feedback control FBγ in Third Embodiment. Each of the graphs in FIG. 2 to FIG. 4 shows changes over time of the fuel amount, a signal of the upstream oxygen sensor 6, and a signal of the downstream oxygen sensor 7 when three feedback controls FBα, FBβ, and FBγ are executed. FIG. 2 shows changes over time of the fuel amount, a signal of the upstream oxygen sensor 6, and a signal of the downstream oxygen sensor 7, when the three-way catalyst 5 is not detached and not deteriorated. FIG. 3 shows changes over time of the fuel amount, a signal of the upstream oxygen sensor 6, and a signal of the downstream oxygen sensor 7, when the three-way catalyst 5 is not detached but is deteriorated. FIG. 4 shows changes over time of the fuel amount, a signal of the upstream oxygen sensor 6, and a signal of the downstream oxygen sensor 7, when the three-way catalyst 5 is detached.

The controller 8 of Second Embodiment determines, in the detachment determination process, whether the three-way catalyst 5 has been detached based on an oxygen sensor delay time Tγ that is a delay time of a change of a signal of the downstream oxygen sensor 7 from a change of a signal of the upstream oxygen sensor 6 while the feedback control FBγ is in execution in the detachment determination process. The controller 8 of Second Embodiment determines in the detachment determination process that the three-way catalyst 5 has been detached, when the oxygen sensor delay time Tγ while the feedback control FBγ is in execution is shorter than a threshold X1. In FIG. 2 to FIG. 4, the oxygen sensor delay time Tγ is a time from a point at which the signal of the upstream oxygen sensor 6 becomes equal to a value A1 equidistant from a first voltage V1 and a second voltage V2 to a point at which the signal of the downstream oxygen sensor 7 becomes equal to the value A1. The controller 8 of Second Embodiment determines in the deterioration determination process that the three-way catalyst 5 has been deteriorated, when an oxygen sensor delay time Tβ while the feedback control FBβ is in execution is shorter than a threshold X2. In FIG. 2 to FIG. 4, the oxygen sensor delay time Tβ is a time from a point at which the signal of the upstream oxygen sensor 6 becomes equal to a value A1 equidistant from a first voltage V1 and a second voltage V2 to a point at which the signal of the downstream oxygen sensor 7 becomes equal to the value A1. The threshold X2 may be larger than or smaller than the threshold X1, or may be equal to the threshold X1. As shown in FIG. 3 and FIG. 4, a difference between the oxygen sensor delay time Tγ when the three-way catalyst 5 is detached and the feedback control FBγ is in execution and the oxygen sensor delay time Tγ when the three-way catalyst 5 is deteriorated and the feedback control FBγ is in execution is larger than a difference between the oxygen sensor delay time Tβ when the three-way catalyst 5 is detached and the feedback control FBβ is in execution and the oxygen sensor delay time Tβ when the three-way catalyst 5 is deteriorated and the feedback control FBβ is in execution. On this account, by executing the detachment determination process in the feedback control FBγ in which the cycle and amplitude of increase and decrease of the fuel amount are longer (larger) than those of the feedback control FBβ for executing the deterioration determination process, it is possible to improve the determination precision of the detachment determination process. As a modification of Second Embodiment, in the detachment determination process, the controller 8 may determine whether the three-way catalyst 5 has been detached by comparing the delay time Tγ while the feedback control FBγ is in execution with the delay time Tγ while the feedback control FBγ prior to the current detachment determination process is in execution.

The controller 8 of Third Embodiment determines, in the detachment determination process, whether the three-way catalyst 5 has been detached based on an oxygen sensor delay time Tβ that is a delay time of a change of a signal of the downstream oxygen sensor 7 from a change of a signal of the upstream oxygen sensor 6 while the feedback control FBβ is in execution in the detachment determination process. The controller 8 of Third Embodiment determines in the detachment determination process that the three-way catalyst 5 has been detached, when the oxygen sensor delay time Tβ while the feedback control FBβ is in execution is shorter than a threshold X3. The controller 8 of Third Embodiment determines in the deterioration determination process that the three-way catalyst 5 has been deteriorated, when the oxygen sensor delay time Tγ while the feedback control FBγ is in execution is shorter than a predetermined threshold. The predetermined threshold is larger than the threshold X3. The feedback control FBγ for executing the deterioration determination process is performed in known straddled vehicles, too. Because the feedback control FBβ for executing the detachment determination process is shorter (smaller) in cycle and amplitude of increase and decrease of the fuel amount than the feedback control FBγ for executing the deterioration determination process, it is possible to suppress the deterioration of drivability as compared to the known straddled vehicles. As a modification of Third Embodiment, in the detachment determination process, the controller 8 may determine whether the three-way catalyst 5 has been detached by comparing the delay time Tβ while the feedback control FBβ is in execution with the delay time Tβ while the feedback control FBβ prior to the current detachment determination process is in execution.

Now, Fourth and Fifth Embodiments will be described with reference to the graphs shown in FIG. 2 to FIG. 4. In Fourth and Fifth Embodiment, the feedback control includes feedback control FBβ of controlling the fuel amount in such a way that the cycle of increase and decrease of the fuel amount is longer than the cycle in the feedback control FBα and/or the amplitude of increase and decrease of the fuel amount is larger than the amplitude in the feedback control FBα. The controller 8 of each of Fourth and Fifth Embodiments determines, in the detachment determination process, whether the three-way catalyst 5 has been detached based on both a signal of the upstream oxygen sensor 6 and a signal of the downstream oxygen sensor 7 while the feedback control FBβ is in execution. In Fourth and Fifth Embodiments, the controller 8 is configured to execute a deterioration determination process of determining whether the three-way catalyst 5 has been deteriorated, based on both a signal of the upstream oxygen sensor 6 and a signal of the downstream oxygen sensor 7 while the feedback control FBβ is in execution. In other words, in Fourth and Fifth Embodiments, the feedback control for executing the detachment determination process is identical with the feedback control for executing the deterioration determination process. In Fourth and Fifth Embodiments, the feedback control FBβ is equivalent to the second feedback control. The controller 8 of each of Fourth and Fifth Embodiments determines, in the detachment determination process, whether the three-way catalyst 5 has been detached based on an oxygen sensor delay time Tβ that is a delay time of a change of a signal of the downstream oxygen sensor 7 from a change of a signal of the upstream oxygen sensor 6 while the feedback control FBβ is in execution in the detachment determination process. The controller 8 of Fourth Embodiment determines in the detachment determination process that the three-way catalyst 5 has been detached, when the oxygen sensor delay time Tβ while the feedback control FBβ is in execution is shorter than a threshold X3. The controller 8 of Fourth Embodiment determines in the deterioration determination process that the three-way catalyst 5 has been deteriorated, when the oxygen sensor delay time Tβ while the feedback control FBβ is in execution is not shorter than the threshold X3 and shorter than the threshold X2. The controller 8 of Fifth Embodiment determines in the detachment determination process that the three-way catalyst 5 has been detached, when the oxygen sensor delay time Tβ while the feedback control FBβ is in execution is shorter than an average of the oxygen sensor delay times Tβ while the feedback controls FBβ prior to the current detachment determination process are in execution and a difference between the oxygen sensor delay time Tβ and the average is larger than a reference value Y1. As a modification of Fourth and Fifth Embodiments, the controller 8 may execute the deterioration determination process and the detachment determination process based on a signal of the upstream oxygen sensor and a signal of the downstream oxygen sensor while the feedback control FBγ is in execution. In this modification, the feedback control FBγ is equivalent to the second feedback control.

Now, Sixth to Eighth Embodiments will be described with reference to the graphs shown in FIG. 2 to FIG. 4. The controller 8 of each of Sixth to Eighth Embodiments determines, in the detachment determination process, whether the three-way catalyst 5 has been detached based on both a signal of the upstream oxygen sensor 6 and a signal of the downstream oxygen sensor 7 while the feedback control FBα is in execution. In Sixth to Eighth Embodiments, the feedback control FBα is executed irrespective of whether to execute the detachment determination process. The controller 8 of each of Sixth and Seventh Embodiments determines, in the detachment determination process, whether the three-way catalyst 5 has been detached based on an oxygen sensor delay time Ta that is a delay time of a change of a signal of the downstream oxygen sensor 7 from a change of a signal of the upstream oxygen sensor 6 while the feedback control FBα is in execution in the detachment determination process. The controller 8 of Sixth Embodiment determines in the detachment determination process that the three-way catalyst 5 has been detached, when the oxygen sensor delay time Tα while the feedback control FBα is in execution is shorter than a threshold X4. In FIG. 2 to FIG. 4, the oxygen sensor delay time Tα is a time from a point at which the signal of the upstream oxygen sensor 6 becomes equal to a value A1 equidistant from a first voltage V1 and a second voltage V2 to a point at which the signal of the downstream oxygen sensor 7 becomes equal to the value A1. The controller 8 of Seventh Embodiment determines in the detachment determination process that the three-way catalyst 5 has been detached, when the oxygen sensor delay time Tα while the feedback control FBα is in execution is shorter than an average of the oxygen sensor delay times Ta while the feedback controls FBα prior to the current detachment determination process are in execution and a difference between the oxygen sensor delay time Tα and the average is larger than a reference value Y2.

The controller 8 of Eighth Embodiment determines, in the detachment determination process, whether the three-way catalyst 5 has been detached based on the number of changes of the signal of the upstream oxygen sensor 6 during a first time period in which the feedback control FBα is in execution and the number of changes of the signal of the downstream oxygen sensor 7 during the first time period. The controller 8 of Eighth Embodiment determines, in the detachment determination process, that the three-way catalyst 5 has been detached when the number of changes of the signal of the upstream oxygen sensor 6 during the first time period is larger than a threshold Z1 and the number of changes of the signal of the downstream oxygen sensor 7 during the first time period is larger than a threshold Z2. The first time period may be, for example, a period of several seconds. The number of changes of the signal of the upstream oxygen sensor 6 during the first time period may be, for example, the number of times when the signal of the upstream oxygen sensor 6 becomes at the second voltage V2 during the first time period, or the number of times when the signal of the upstream oxygen sensor 6 becomes at the value A1. The number of changes of the signal of the downstream oxygen sensor 7 during the first time period may be, for example, the number of times when the signal of the downstream oxygen sensor 7 becomes at the second voltage V2 during the first time period, or the number of times when the signal of the downstream oxygen sensor 7 becomes at the value A1. As shown in FIG. 3 and FIG. 4, between the same periods in which the feedback control FBα is in execution, the number of changes of the signal of the downstream oxygen sensor 7 when the three-way catalyst 5 is detached tends to be larger than the number of changes of the signal of the downstream oxygen sensor 7 when the three-way catalyst 5 is deteriorated. On this account, it is less likely to mistake a case where the three-way catalyst 5 is deteriorated for a case where the three-way catalyst 5 is detached. It is possible to execute the detachment determination process without needing, for the detachment determination process, feedback control that is different from the normal feedback control.

Now, Ninth and Tenth Embodiments will be described with reference to the graphs shown in FIG. 5 to FIG. 6. In Ninth and Tenth Embodiments, the controller 8 executes the detachment determination process by utilizing fuel cut control of temporarily stopping supply of fuel to the combustion chamber 3. In Ninth and Tenth Embodiments, the controller 8 executes the detachment determination process by utilizing at least a signal of the downstream oxygen sensor 7 when the feedback control FBα is shifted to the fuel cut control. Each of the graphs in FIG. 5 and FIG. 6 shows changes over time of a signal of the upstream oxygen sensor 6 and a signal of the downstream oxygen sensor 7 when the feedback control FBα is shifted to the fuel cut control. The graph of FIG. 5 shows changes over time of a flag of the fuel cut control, a signal of the upstream oxygen sensor 6, and a signal of the downstream oxygen sensor 7 when the three-way catalyst 5 is not detached. The graph of FIG. 6 shows changes over time of a flag of the fuel cut control, a signal of the upstream oxygen sensor 6, and a signal of the downstream oxygen sensor 7 when the three-way catalyst 5 is detached. The controller 8 of Ninth Embodiment determines, in the detachment determination process, whether the three-way catalyst 5 has been detached based on a delay time Tψ of a change of a signal of the downstream oxygen sensor 7 while the fuel cut control is in execution from a change of a signal of the upstream oxygen sensor 6 while the feedback control FB a or the fuel cut control is in execution. The controller 8 of Ninth Embodiment determines in the detachment determination process that the three-way catalyst 5 has been detached, when the delay time Tψ is shorter than a threshold X5. In FIG. 5 and FIG. 6, the delay time Tψ is a time from a point at which the signal of the upstream oxygen sensor 6 becomes equal to a value A1 equidistant from a first voltage V1 and a second voltage V2 to a point at which the signal of the downstream oxygen sensor 7 becomes equal to the value A1. To be more specific, the delay time Tψ is a time from a point at which the signal of the upstream oxygen sensor 6 becomes equal to the value A1 immediately before the signal becomes constant at the second voltage V2 to a point at which the signal of the downstream oxygen sensor 7 becomes equal to the value A1. While in FIG. 5 and FIG. 6 the signal of the upstream oxygen sensor 6 becomes equal to the value A1 during the fuel cut control, the signal of the upstream oxygen sensor 6 may become equal to the value A1 during the feedback control FBα. The controller 8 of Tenth Embodiment determines, in the detachment determination process, whether the three-way catalyst 5 has been detached based on a delay time Tω of a change of a signal of the downstream oxygen sensor 7 while the fuel cut control is in execution from the start of the fuel cut control. The controller 8 of Tenth Embodiment determines in the detachment determination process that the three-way catalyst 5 has been detached, when the delay time Tω is shorter than a threshold X6. In FIG. 5 and FIG. 6, the delay time Tω is a time from the start of the fuel cut control to a time point at which the signal of the downstream oxygen sensor 7 becomes equal to a value A1 which is equidistant from the first voltage V1 and the second voltage V2. As a modification of Ninth and Tenth Embodiments, the controller 8 may determine in the detachment determination process whether the three-way catalyst 5 has been detached, by comparing the delay time Ty, To with the delay time Tψ, Tω at the time of the shift from the feedback control FBα to the fuel cut control prior to the current detachment determination process.

Figure 7A:
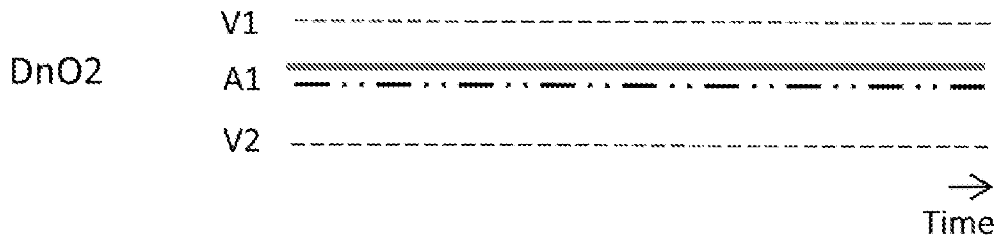
FIG. 7A is a graph for explaining Eleventh Embodiment of the present teaching.

The following will describe Eleventh Embodiment of the present teaching. A straddled vehicle 1 of Eleventh Embodiment encompasses all features of First Embodiment. The controller 8 of Eleventh Embodiment determines in the detachment determination process whether a signal that is input as a signal of the downstream oxygen sensor 7 is a signal that is input to the controller 8 not electrically connected to the downstream oxygen sensor 7. When it is determined that a signal input as a signal of the downstream oxygen sensor 7 is a signal input to the controller 8 not electrically connected to the downstream oxygen sensor 7, the controller 8 determines that the three-way catalyst 5 has been detached. Therefore, when a signal that is input as a signal of the downstream oxygen sensor 7 is a signal that is input when the downstream oxygen sensor 7 is detached from the straddled vehicle 1, the controller 8 determines that the three-way catalyst 5 has been detached. FIG. 7A shows an example of the signal that is input to the controller 8 as the signal of the downstream oxygen sensor 7 when the downstream oxygen sensor 7 is detached. The signal input to the controller 8 as a signal of the downstream oxygen sensor 7 when the downstream oxygen sensor 7 is detached is different from a signal input to the controller 8 as a signal of the downstream oxygen sensor 7 when the downstream oxygen sensor 7 is not detached. The same applies to the upstream oxygen sensor 6. For example, when the downstream oxygen sensor 7 is an O2 sensor, a signal that is at neither the first voltage V1 nor the second voltage V2 shown in FIG. 2 to FIG. 6 is input to the controller 8. The straddled vehicle 1 may be arranged so that, when the three-way catalyst 5 is detached from the straddled vehicle 1, the downstream oxygen sensor 7 is detached together with the three-way catalyst 5. In such a case, when the downstream oxygen sensor 7 is detached, the three-way catalyst 5 is assumed to be detached, too. Even if the straddled vehicle 1 is not structured in this way, when the three-way catalyst 5 is detached from the straddled vehicle 1, the downstream oxygen sensor 7 is likely to be detached, too. It is therefore possible to determine whether the three-way catalyst 5 has been detached based on a signal input as a signal of the downstream oxygen sensor 7.

Figure 7B:
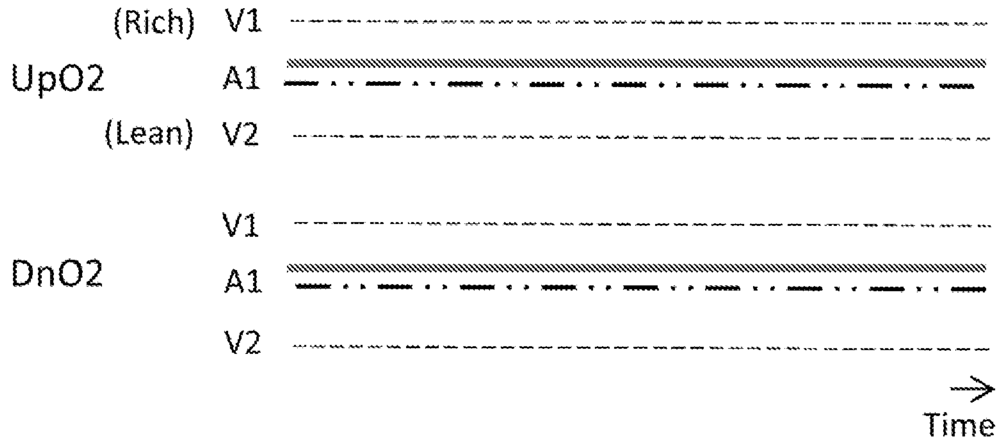
FIG. 7B is a graph for explaining Twelfth Embodiment of the present teaching.

The following will describe Twelfth Embodiment of the present teaching. A straddled vehicle 1 of Twelfth Embodiment encompasses all features of First Embodiment. The controller 8 of Twelfth Embodiment determines in the detachment determination process whether a signal that is input as a signal of the upstream oxygen sensor 6 is a signal that is input to the controller 8 not electrically connected to the upstream oxygen sensor 6 and a signal that is input as a signal of the downstream oxygen sensor 7 is a signal that is input to the controller 8 not electrically connected to the downstream oxygen sensor 7. When it is determined that a signal input as a signal of the upstream oxygen sensor 6 is a signal input to the controller 8 not electrically connected to the upstream oxygen sensor 6 and a signal input as a signal of the downstream oxygen sensor 7 is a signal input to the controller 8 not electrically connected to the downstream oxygen sensor 7, the controller determines that the three-way catalyst 5 has been detached. Therefore, when a signal that is input as a signal of the upstream oxygen sensor 6 is a signal that is input when the upstream oxygen sensor 6 is detached from the straddled vehicle 1 and a signal that is input as a signal of the downstream oxygen sensor 7 is a signal that is input when the downstream oxygen sensor 7 is detached from the straddled vehicle 1, the controller 8 determines that the three-way catalyst 5 has been detached. FIG. 7B shows an example of a signal that is input to the controller 8 as a signal of the upstream oxygen sensor 6 and a signal that is input to the controller 8 as a signal of the downstream oxygen sensor 7, when the upstream oxygen sensor 6 and the downstream oxygen sensor 7 are detached. The straddled vehicle 1 may be arranged so that, when the three-way catalyst 5 is detached from the straddled vehicle 1, the upstream oxygen sensor 6 and the downstream oxygen sensor 7 are detached together with the three-way catalyst 5. In such a case, when the upstream oxygen sensor 6 and the downstream oxygen sensor 7 are detached, the three-way catalyst 5 is assumed to be detached, too. Even if the straddled vehicle 1 is not structured in this way, when the three-way catalyst 5 is detached from the straddled vehicle 1, the upstream oxygen sensor 6 and the downstream oxygen sensor 7 are likely to be detached, too. It is therefore possible to determine whether the three-way catalyst 5 has been detached based on a signal input as a signal of the upstream oxygen sensor 6 and a signal input as a signal of the downstream oxygen sensor 7. Because both a signal input as a signal of the upstream oxygen sensor 6 and a signal input as a signal of the downstream oxygen sensor 7 are used, the precision of determination in the detachment determination process can be improved as compared to Eleventh Embodiment.

Second to Twelfth Embodiment may be implemented in combination. In other words, the controller 8 may be arranged to have two or more of the detachment determination processes of Second to Twelfth Embodiments. For example, the controller 8 of each of Second and Third Embodiments may be arranged to perform the detachment determination process of Fourth Embodiment or Fifth Embodiment. For example, the controller 8 of each of Second to Fifth Embodiments may be arranged to perform the detachment determination process of any one of Sixth Embodiment to Eighth Embodiment. For example, the controller 8 of each of Second to Eighth Embodiments may be arranged to perform the detachment determination process of Ninth Embodiment or Tenth Embodiment. The controller 8 of each of Second to Tenth Embodiments may be arranged to perform the detachment determination process of Eleventh Embodiment or Twelfth Embodiment.

The controller 8 of each of First to Twelfth Embodiments may be configured to further execute a detachment determination process of determining whether the three-way catalyst 5 has been detached based not on a signal input as a signal of the downstream oxygen sensor 7 but on a signal input as a signal of the upstream oxygen sensor 6. For example, the controller 8 may execute the detachment determination process of determining that the three-way catalyst 5 has been detached, when a signal that is input as a signal of the upstream oxygen sensor 6 is a signal that is input when the upstream oxygen sensor 6 is detached from the straddled vehicle 1. A controller of a straddled vehicle may be arranged to execute only this detachment determination process, although such an arranged is not encompassed in the present teaching.

The controller 8 of each of First to Twelfth Embodiments may be arranged to further execute a detachment determination process of determining whether the three-way catalyst 5 has been detached based on a signal of a detection unit that is neither the upstream oxygen sensor 6 nor the downstream oxygen sensor 7. A controller of a straddled vehicle may be arranged to execute only this detachment determination process, although such an arranged is not encompassed in the present teaching. The detection unit may be a sensor exclusively used for the detachment determination process. The detection unit may be a sensor that is used for a process or control different from the detachment determination process. The detection unit used for a process or control different from the detachment determination process may be an intake pressure sensor. The detection unit exclusively used for the detachment determination process may be, for example, a camera which is configured to read a two-dimensional barcode provided on an outer surface of a catalyst unit that is detached together with the three-way catalyst. When one-dimensional barcode is provided in place of the two-dimensional barcode, the detection unit exclusively used for the detachment determination process may be a line sensor. The detection unit may be an exhaust gas temperature sensor configured to detect the temperature sensor of exhaust gas. The exhaust gas temperature sensor may be provided downstream or upstream of the three-way catalyst in a flow direction of the exhaust gas. The exhaust gas temperature sensor may be used exclusively for the detachment determination process, or may be used for a process or control different from the detachment determination process. The detection unit may be an exhaust gas pressure sensor configured to detect the pressure of exhaust gas. The exhaust gas pressure sensor may be provided downstream or upstream of the three-way catalyst in a flow direction of the exhaust gas. The exhaust gas pressure sensor may be used exclusively for the detachment determination process, or may be used for a process or control different from the detachment determination process.

The invention claimed is:

1. A straddled vehicle, comprising:

an engine, which includes a combustion chamber;

a three-way catalyst, which is configured to purify exhaust gas exhausted from the combustion chamber;

an upstream oxygen sensor, which is provided upstream of the three-way catalyst in a flow direction of the exhaust gas, and is configured to detect an oxygen concentration in the exhaust gas, a downstream oxygen sensor, which is provided downstream of the three-way catalyst in the flow direction of the exhaust gas, and is configured to detect the oxygen concentration in the exhaust gas; and a controller, which includes:

a processor, and a non-transitory storage medium containing program instructions, execution of which by the processor causes the controller to control a fuel amount supplied to the combustion chamber to periodically increase and decrease the fuel amount, based on a signal input as a signal of an upstream oxygen sensor, and execute a detachment determination process of determining whether the three-way catalyst is detached based on both the signal input as the signal of the upstream oxygen sensor and the signal input as a signal of the downstream oxygen sensor, when the fuel amount is controlled to periodically increase and decrease based on the signal input as the signal of the upstream oxygen sensor, wherein the controller is configured to perform first feedback control, thereby controlling the fuel amount to periodically increase and decrease with a first cycle, based on the signal input as the signal of the upstream oxygen sensor, and to perform second feedback control, thereby controlling the fuel amount to periodically increase and decrease with a second cycle, based on the signal input as the signal of the upstream oxygen sensor, the second cycle in the second feedback control being longer than the first cycle in the first feedback control, and/or an amplitude of the fuel amount in the second feedback control being larger than the amplitude of the fuel amount in the first feedback control, and in the detachment determination process, the controller is configured to determine whether the three-way catalyst is detached based on both the signal input as the signal of the upstream oxygen sensor and the signal input as the signal of the downstream oxygen sensor, while the second feedback control is in execution.

2. The straddled vehicle according to claim 1, wherein, in the detachment determination process, the controller is configured to determine whether the three-way catalyst is detached based on an oxygen sensor delay time while the second feedback control is in execution, the oxygen sensor delay time being a time difference between a change of the signal input as the signal of the downstream oxygen sensor and a change of the signal input as the signal of the upstream oxygen sensor.

3. The straddled vehicle according to claim 2, wherein, in the detachment determination process, the controller is configured to determine whether the three-way catalyst is detached by comparing the oxygen sensor delay time while the second feedback control is in execution with a threshold.

4. The straddled vehicle according to claim 2, wherein in the detachment determination process, the controller is configured to determine whether the three-way catalyst is detached by comparing the oxygen sensor delay time while the second feedback control is in execution with a second oxygen sensor delay time, the second oxygen sensor delay time is a time difference between a change of the signal input as the signal of the downstream oxygen sensor and a change of the signal input as the signal of the upstream oxygen sensor, while fourth feedback control is in execution before the second feedback control, and the fourth feedback control is another control with which the controller periodically increases and decreases the fuel amount with a fourth cycle based on the signal input as the signal of the upstream oxygen sensor, the fourth cycle and the amplitude of the fuel amount in the fourth feedback control being identical to the second cycle and the amplitude of the fuel amount in the second feedback control.

5. The straddled vehicle according to claim 1, wherein, the controller is configured to execute a deterioration determination process of determining whether the three-way catalyst is deteriorated based on both the signal input as the signal of the upstream oxygen sensor and the signal input as the signal of the downstream oxygen sensor, while the second feedback control is in execution.

6. The straddled vehicle according to claim 1, wherein, the controller is configured to perform third feedback control, thereby controlling the fuel amount to periodically increase and decrease with a third cycle based on the signal input as the signal of the upstream oxygen sensor, the third cycle in the third feedback control is longer than the first cycle in the first feedback control, and/or the amplitude of the fuel amount in the third feedback control is larger than the amplitude of the fuel amount in the first feedback control, the third cycle in the third feedback control is different from the second cycle in the second feedback control, and/or the amplitude of the fuel amount in the third feedback control is different from the amplitude of the fuel amount in the second feedback control, and the controller is configured to execute a deterioration determination process of determining whether the three-way catalyst is deteriorated based on both the signal input as the signal of the upstream oxygen sensor and the signal input as the signal of the downstream oxygen sensor, while the third feedback control is in execution.

7. A straddled vehicle, comprising:

an engine, which includes a combustion chamber;

a three-way catalyst, which is configured to purify exhaust gas exhausted from the combustion chamber;

an upstream oxygen sensor, which is provided upstream of the three-way catalyst in a flow direction of the exhaust gas, and is configured to detect an oxygen concentration in the exhaust gas, a downstream oxygen sensor, which is provided downstream of the three-way catalyst in the flow direction of the exhaust gas, and is configured to detect the oxygen concentration in the exhaust gas; and a controller, which includes:

a processor, and a non-transitory storage medium containing program instructions, execution of which by the processor causes the controller to control a fuel amount supplied to the combustion chamber to periodically increase and decrease the fuel amount, based on a signal input as a signal of an upstream oxygen sensor, and execute a detachment determination process of determining whether the three-way catalyst is detached based on both the signal input as the signal of the upstream oxygen sensor and the signal input as a signal of the downstream oxygen sensor, when the fuel amount is controlled to periodically increase and decrease based on the signal input as the signal of the upstream oxygen sensor, wherein the controller is configured to perform first feedback control, thereby controlling the fuel amount to periodically increases and decreases with a first cycle, based on the signal input as the signal of the upstream oxygen sensor, and to perform second feedback control, thereby controlling the fuel amount to periodically increases and decreases with a second cycle, based on the signal input as the signal of the upstream oxygen sensor, the second cycle in the second feedback control being longer than the first cycle in the first feedback control, and/or an amplitude of the fuel amount in the second feedback control being larger than the amplitude of the fuel amount in the first feedback control, and in the detachment determination process, the controller is configured to determine whether the three-way catalyst is detached based on both the signal input as the signal of the upstream oxygen sensor and the signal input as the signal of the downstream oxygen sensor, while the first feedback control is in execution.

8. The straddled vehicle according to claim 7, wherein, when the signal input as the signal of the downstream oxygen sensor is changed while the first feedback control is in execution, the controller is configured to execute the detachment determination process of determining whether the three-way catalyst is detached based on an oxygen sensor delay time while the first feedback control is in execution, the oxygen sensor delay time being a time difference between the change of the signal input as the signal of the downstream oxygen sensor and a change of the signal input as the signal of the upstream oxygen sensor.

9. The straddled vehicle according to claim 8, wherein, in the detachment determination process, the controller is configured to determine whether the three-way catalyst is detached by comparing the oxygen sensor delay time while the first feedback control is in execution with a threshold.

10. The straddled vehicle according to claim 8, wherein in the detachment determination process, the controller is configured to determine whether the three-way catalyst is detached by comparing the oxygen sensor delay time while the first feedback control is in execution with a second oxygen sensor delay time, the second oxygen sensor delay time is a time difference between a change of the signal input as the signal of the downstream oxygen sensor and a change of the signal input as the signal of the upstream oxygen sensor, while fifth feedback control is in execution before the first feedback control, and the fifth feedback control is another control with which the controller periodically increases and decreases the fuel amount with a fifth cycle based on the signal input as the signal of the upstream oxygen sensor, the fifth cycle and the amplitude of the fuel amount in the fifth feedback control being identical to the first cycle and the amplitude of the fuel amount in the first feedback control.

11. The straddled vehicle according to claim 7, wherein, in the detachment determination process, the controller is configured to determine whether the three-way catalyst is detached based on a number of changes of the signal input as the signal of the upstream oxygen sensor during a first time period in which the first feedback control is in execution, and a number of changes of the signal input as the signal of the downstream oxygen sensor during the first time period.

12. A straddled vehicle comprising:

an engine, which includes a combustion chamber;

a three-way catalyst, which is configured to purify exhaust gas exhausted from the combustion chamber;

an upstream oxygen sensor, which is provided upstream of the three-way catalyst in a flow direction of the exhaust gas, and is configured to detect an oxygen concentration in the exhaust gas;

a downstream oxygen sensor, which is provided downstream of the three-way catalyst in the flow direction of the exhaust gas, and is configured to detect the oxygen concentration in the exhaust gas; and a controller, which includes:

a processor, and a non-transitory storage medium containing program instructions, execution of which by the processor causes the controller to control a fuel amount supplied to the combustion chamber to periodically increase and decrease the fuel amount, based on a signal input as a signal of an upstream oxygen sensor, and execute a detachment determination process of determining whether the three-way catalyst is detached based on at least the signal input as a signal of the downstream oxygen sensor, when the fuel amount is controlled to periodically increase and decrease based on the signal input as the signal of the upstream oxygen sensor, wherein, the controller further includes a downstream oxygen sensor interface connected to the downstream oxygen sensor and an upstream oxygen sensor interface connected to the upstream oxygen sensor, the controller is so configured that, when the downstream oxygen sensor is detached from the straddled vehicle, a value of a signal input to the downstream oxygen sensor interface is maintained at a predetermined first value, and when the upstream oxygen sensor is detached from the straddled vehicle, a value of a signal input to the upstream oxygen sensor interface is maintained at a predetermined second value, and the controller is further configured to execute a second detachment determination process of determining that the three-way catalyst is detached, when the value of the signal input to the downstream oxygen sensor interface is maintained at the first value, or when the value of the signal input to the downstream oxygen sensor interface is maintained at the first value and the value of the signal input to the upstream oxygen sensor interface is maintained at the second value.

* * * * *